June 11, 1957 H. S. HALL ET AL 2,795,687

FUSING MACHINE

Filed Oct. 7, 1954 2 Sheets-Sheet 1

INVENTORS
H.S. HALL
E.D. LONG
W.R. YEICH

By W. C. Parnell
ATTORNEY

June 11, 1957 H. S. HALL ET AL 2,795,687

FUSING MACHINE

Filed Oct. 7, 1954 2 Sheets-Sheet 2

INVENTORS
H.S. HALL
E.D. LONG
W.R. YEICH

By W. C. Parnell

ATTORNEY

Patented June 11, 1957

2,795,687

FUSING MACHINE

Howard S. Hall, Reading, Earl D. Long, Wyomissing, and William R. Yeich, West Lawn, Pa., assignors to Western Electric Company, Incorporated, New York, N. Y., a corporation of New York Application October 7, 1954, Serial No. 460,811

8 Claims. (Cl. 219—85)

This invention relates to a fusing machine and particularly to a machine for fusing small gage wires to a relatively large body.

In welding and fusing operations where small, delicate parts are involved, it is necessary to control carefully both the temperature and time during which the parts are subjected to the high fusing temperatures in order to prevent damage thereto. Generally speaking it is necessary to fuse such parts quickly in order that the total energy expended be held to a minimum, the total energy required for a quick fusing operation being considerably less than that required for a slow one even though it may require higher temperatures. The larger the total energy expended the more likely the parts will be damaged due to excessive conduction through the parts. Particularly in the case of silicon varistors wherein aluminum and gold wires having diameters in the order of 0.005 of an inch are fused to a relatively large silicon wafer, it is essential to control the time during which the small gage aluminum lead is subjected to the high temperatures to prevent the wire from being vaporized or melted.

It is, therefore, the principal object of this invention to provide apparatus for accurately and uniformly fusing the leads and wafer of such devices without damaging the parts.

In an illustrative embodiment of the invention, a fixture is provided with a heating support member for the wafers, an adjustable holder for the wire leads, the holder being movable with respect to the wafer support, and means for moving the holder. A control circuit for the device, which may be energized after the leads have been adjusted on a wafer, actuates the holder moving means to lift the leads off the wafer before the wafer may be heated. When the support has been heated for a predetermined time, to bring the wafer to a prescribed temperature, the leads are moved back on the wafer for fusing thereto. The circuit controls a cycle for the heating of the wafer support member to vary the temperature of the wafer from room temperature to an initially high fusing temperature then, gradually lowers it to a predetermined lower temperature.

These and other features of the invention will be more fully understood from the following detailed description taken in conjunction with the accompanying drawing, in which.

Figures 1, 4:
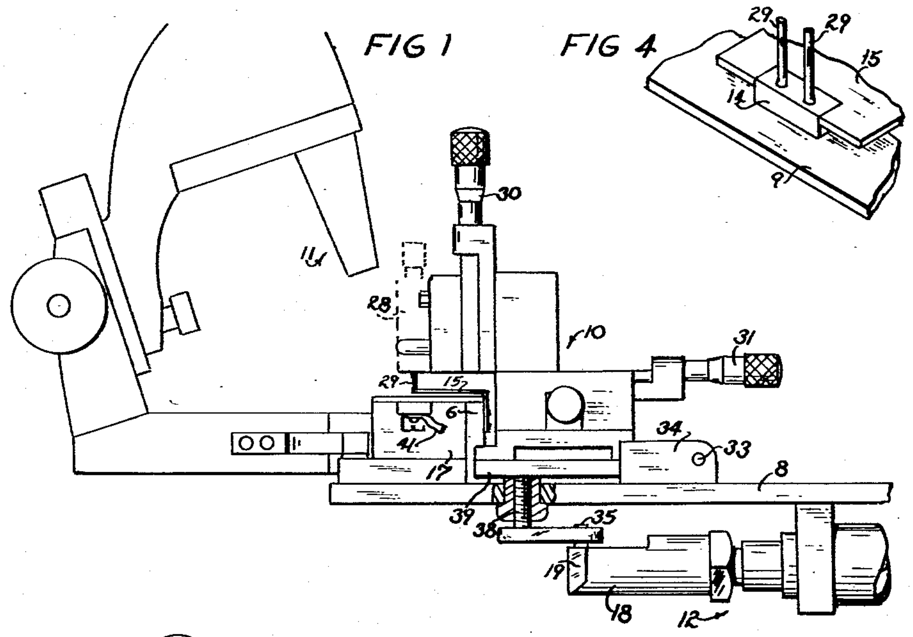
Fig. 1 is a side elevational, partially broken away view of the fixture together with a microscope for observing the wire lead contact area thereof.
Fig. 4 shows the wafer heating and guide members with a wafer and wires thereon.
Figure 2:
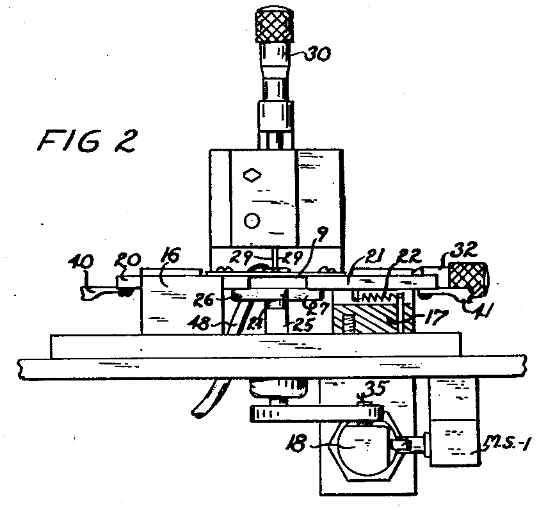
Fig. 2 is a front elevational view, partially in section, of the device of Fig. 1.
Figure 3:
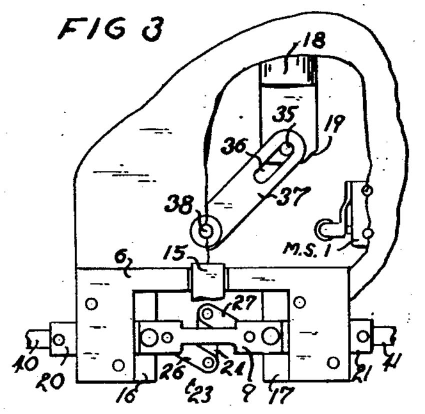
Fig. 3 is a partial plan view of the heating support element of the device showing the expansion control linkage therefor.

Referring now to the drawing and particularly to Figs. 1 to 4, the mechanical fixture portion of the machine comprises basically a fixed base member 8 having a heating support member 9 thereon for the wafers, a pivoted adjustable wire lead holder 10 and an actuator 12 for pivoting the wire holder 10 to lift the wire leads up off a wafer 14 on the member 9 or to move the leads down on the wafer as required. A microscope 11 which may be used to facilitate the positioning of the wire leads on the wafer is also mounted on the base.

Figure 5:
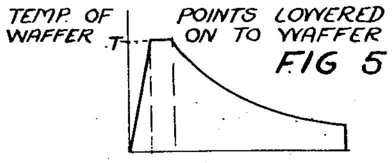
Figs. 5 and 6 are curves showing the temperature of the wafer vs. time and heating transformer current vs. time, respectively for the fusing cycle.
Figure 6:
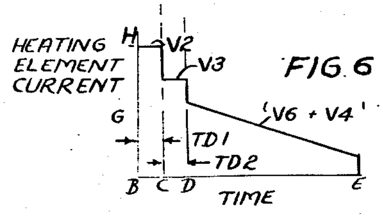

The wafer support and heating member 9 is a thin ribbon of nichrome or other similar high resistance electrical heating material. The ribbon is connected to a source of electrical power through leads 40 and 41 connected to slidably mounted members 20 and 21 respectively at the ends of the ribbon. The ribbon has a quick temperature response to variations in the heating current passing therethrough, the ribbon having a thickness of about 0.010 of an inch and width of about 3/16 of an inch. The total energy required for heating the silicon diode is not very great, it having dimensions in the order of 0.085 by 0.050 by 0.025 of an inch. The curve of Fig. 5 shows how the temperature of the wafer varies with time while the curve of Fig. 6 shows the corresponding current through the heating member 9, an ammeter 51 being inductively coupled to the member 9 circuit for observing the current therethrough.

In order to keep the nichrome ribbon 9 from sagging when it expands due to heating, the ribbon is slidably mounted on the base members 16 and 17, spring tension being applied at each end of the ribbon by springs 22 connected to the slidably mounted members 20 and 21, respectively. To prevent displacing of the ribbon more to one side than the other when heating, which would move the middle part of the ribbon on which the wafer is positioned, a linkage arrangement 23 is employed. The middle of connecting link 24 is pivoted to the base on upright member 25 and links 26 and 27 are pivotally connected to the opposite ends of link 24. The other ends of links 26 and 27 are connected to the slidable members 20 and 21 respectively at points equidistant from the center thereof. Movement in either member 20 or 21 due to expansion of the ribbon while heating will result in equal movement in the other member 21 or 20. This linkage compensates for differences in tensions of springs 22 at different conditions of expansion of the ribbon as well as for unequal expansion in the ribbon itself. The wafer is supported on the mid portion of the ribbon, a notched out guide member 15 supported on the upright base member 6 accurately locating the wafer at this point. To minimize oxidation of the parts during the heating cycle, helium or other inert gas is applied to the wafer-wire contact area by means of tube 48 which is connected to a source of the gas and which has an open end directed at the wafer support.

Wire leads 29 to be fused on the wafer 14 are secured in a detachable clamping member 28 and the ends of the wires which extend from the clamp are trimmed to equal lengths prior to mounting on the holder 10 of the fixture. The holder 10 to which the clamp 28 is mounted includes a micromanipulator having micrometer screws 30, 31 and 32 for moving the wire leads in any of three directions, the entire lead holder 10 including plate 39 is pivotally mounted on the base 8 by pin 33 in a U-shaped bracket 34.

The holder 10 may be raised or lowered as required by an air motor actuator 12. A pin 35 on the axially movable member 18 of the air motor is slidably positioned in a slot 36 in member 37 for rotating screw 38 in the base member 8, which when rotated, engages the lead holder plate 39 to move the lead support about its pivot 33. When the air motor is actuated, the axially moving member 18 rotates the screw 38 approximately 90° which is sufficient to raise the adjusted lead wires off the wafer. The movable member 18 of the air motor is provided with a camming surface 19 for operating a micro-switch MS1 the function of which will be described below in connection with the description of the control circuit.

Figure 7:
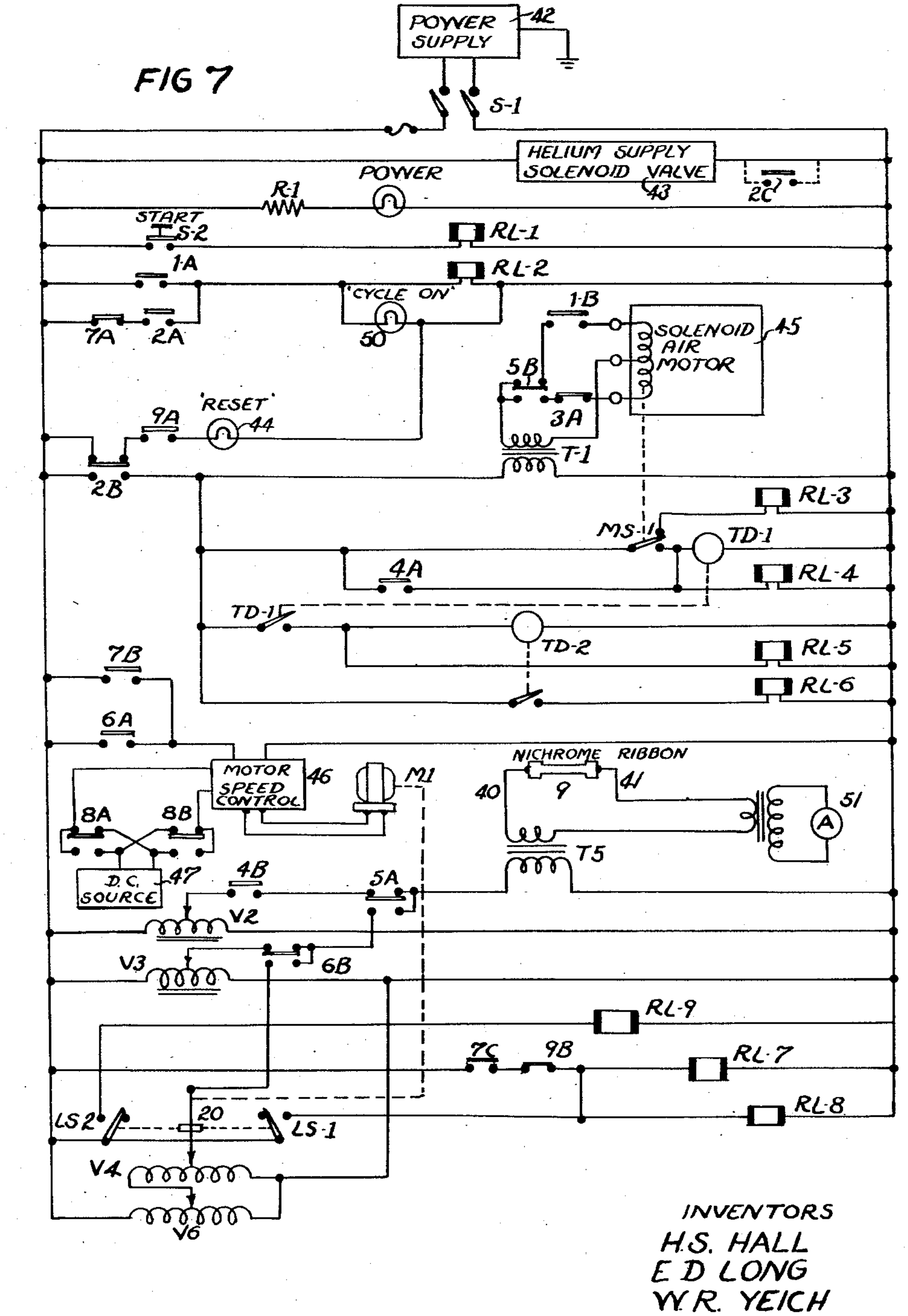
Fig. 7 is a schematic diagram of the control circuit for the machine.

In describing the operation of the control circuit (Fig. 7) reference will be made to Figs. 5 and 6 which show temperature of a wafer on the heating member vs. time and the current flow through the heating member vs. time, respectively. The circuit provides automatic control for cyclicly varying the temperature through the heating member. To facilitate a complete understanding of this circuit the description will be given in conjunction with its operation.

A power switch S1 is closed to energize the circuit from a commercial A. C. power supply 42 and immediately actuates a helium supply solenoid valve 43 to start the flow of helium around the wafer on the ribbon. To start the fusing cycle, button switch S2 is pushed momentarily to close the energizing circuit for relay RL1 which closes its contacts 1A and 1B, contacts 1A closing the energizing circuit for "Cycle On" indicator 50 and relay RL2 causing it to operate and close its lock-up contacts 2A which by-passes the momentarily actuated energizing contacts 1A. Contacts 2B of relay RL2 close to de-energize the "Reset" indicator 44 and to energize transformer T1, operated contacts 1B of relay RL1 in the secondary circuit of the transformer completing the energizing circuit for the air motor solenoid 45 which actuates the air motor to raise the lead holder lifting the leads off the wafer. In lifting the lead support camming surface 19 on the air motor, actuator 18 closes micro-switch MS1 to de-energize relay RL3 and energizes timer TD1 and relay RL4. Operated contacts 4A of relay RL4 by-pass micro-switch MS1; relay RL4 will remain operated until relay RL2 is de-energized. Contacts 4B of relay RL4 close to complete the energizing circuit for transformer T5, the heating element transformer, through an autotransformer V–2. Autotransformer V–2 is adjusted to provide a large current "H" (Fig. 6) to pass through the heating element 9, the transformer T5 being of the type commonly used for welding, having a high voltage primary winding and a very low voltage, high current capacity secondary winding. As seen by the portion B—C in the curve of Fig. 5, this brings the ribbon rapidly to a high temperature T. This temperature is in the order of 900° C. for the fusing operation for the silicon varistor. This large current continues until timer TD1 times out at time C of curve 6 when the contacts of timer TD1 close to energize relay RL5 which operates contacts 5B to actuate the air motor solenoid in the reverse direction to lower the leads onto the wafer. For the silicon varistor illustration, C is about two to three seconds after the start of the cycle at B. As soon as the air motor actuates, micro-switch MS1 is moved to its normal position as shown, thereby re-energizing relay RL3, the contacts 3A of which operate to open the solenoid 45 energizing circuit. At the same time, contacts 5A of relay RL5 remove autotransformer V2 from the heating element transformer T5 and connect autotransformer V3 thereto for the second portion of the cycle during which the current through the nichrome ribbon is heated to a lower value as determined by autotransformer V3. This is seen in Fig. 6 between C and D. This is done in order to keep the temperature of the ribbon substantially at a constant value T (Fig. 5 for fusing). The second portion of the cycle is timed by timer TD2 which was energized when timer TD1 timed out and lasts for about two seconds. When timer TD2 times out, relay RL6 is energized, contacts 6B thereof switch transformer 5 from autotransformer V3 to autotransformers V4 and V6. Contacts 6A of relay RL6 close the motor speed control circuit 46 for drive motor M1 which drives autotransformer V4 for the last portion of the cycle from D to E of curve 6 which lasts about 15 seconds. Autotransformer V6 is adjusted for producing a current in the heating element 9 of G amperes (Fig. 6) when autotransformer V4 is at its maximum setting. Autotransformer V4 is driven by motor M1 to its minimum value at time E, Fig. 6, when a cam 20 on the driven member of autotransformer V4 actuates switch LS1. During this portion of the cycle the current through the nichrome ribbon is gradually lowered to cool the silicon wafer slowly. The rate of decrease in current is determined by the rate at which motor M1 drives autotransformer V4. When switch LS1 is energized, relays RL7 and RL8 are energized to reset the relays RL2 when contacts 7A of relay RL7 operate and relays RL3, RL4, RL5, RL6 and timers TD1 and TD2 when contacts 2B of relay RL2 open. The energizing circuit for transformer T5 is opened to cut off the heating cycle when contacts 5A and 4B of relays RL5 and RL4, respectively are returned to their normal unoperated positions. The motor drive M1 for autotransformer V4 also stops when contacts 6A of relay RL6 open.

At the same time that the relays and timers are being reset, relay RL8 operates its contacts 8A and 8B to reverse the polarity of the D. C. source 47 connected to the motor speed control 46 for motor M1 and contacts 7B of relay RL7 close to start the motor M1 to drive autotransformer V4 in its reset direction, a lock-up contact 7C being provided on relay RL7 to prevent de-energizing relays RL7 and RL8 when switch LS1 is released. When the movable contact of autotransformer V4 has been driven to its start position, cam 20 actuates switch LS2 to close the energizing circuit for relay RL9 contacts 9B thereon opening the energizing circuit for relays RL7 and RL8 and contacts 9A of relay RL9 finally close to energize the "Reset" indicator 44 which informs the operator that the machine is ready for the next fusing operation.

In the circuit as described the helium supply is turned on as soon as the power switch S1 is closed and is not turned off until the power switch S1 is open. This arrangement has proven satisfactory when the machine is used continuously, however, when it is not used in this manner it may be desirable to have the helium source turned on only for each fusing operation, in which case the power supply connection for the solenoid 43 may be provided through contacts 2C of relay RL2 as shown in dashed lines in Fig. 7.

To operate the machine then, the wire clamp 28 is mounted to the pivoted holder 10 and a silicon wafer is placed on the nichrome ribbon on the guide notch of the positioning element 15 and the micrometer screws 30, 31 and 32 are adjusted to properly locate the wires on the wafer, the micrometer screw 30 being adjusted to give a prescribed tensioning of the wires on the wafer. The power switch S1 is actuated and the start button S2 momentarily depressed to start the cycle, the remainder of the operation being automatic once preset adjustments have been made on the timers and variacs.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a machine for fusing small gage wires to wafers, a support member for the wafers, means for heating the support member, movable means for holding the wires on a wafer on the support, means for moving the wire holding means, means controlling the moving means to lift the wires off the wafer, means operative after the wires have been lifted for applying heating energy to the support, and means operative a timed interval after the application of heating energy for lowering the holder to move the wires into fusing contact with the wafer.

2. In a machine for fusing wire leads to a semiconductor body, a base member, a support member for the body, a source of heating energy for the support member, a holder pivotally mounted on the base for holding the wires on the body, said holder having adjustable means for moving the wires extending therefrom in any of three mutually normal directions, a screw lifting mechanism for the holder mounted in the base, an actuator for turning the screw mechanism for raising the holder about its pivot to lift the wires off the body means controlled by the actuator when the holder is lifted for applying heating energy from the source to the support member and means operative after heating energy has been applied to the support for a prescribed time for controlling the actuator to lower the holder to move the wires extending therefrom into fusing contact with the body.

3. A machine for fusing wire leads to a semi-conductor wafer comprising a base member, a thin electrical heating support member for the wafers, end members for the support member, means for slidably mounting the end members on the base, a spring connected between each end member and the base to stretch the support member, a source of electrical heating energy for the support member, means pivotally mounted on the base for holding the wire leads on a wafer on the support said holding means having adjustable means for moving the wires extending therefrom in any of three mutually normal directions, a screw lifting mechanism for the holding means mounted on the base, means for turning the screw mechanism to move the holding means about its pivot to lift the wires off the wafer, means operative after the wires have been lifted for applying electrical heating energy to the support member and means operable after the support member has been heated for a prescribed time for lowering the holder to move the wires into fusing contact with the wafer.

4. A machine for fusing wire leads to a body comprising an electrical heating support member having means for accurately locating the body thereon, movable means for holding the wires on a wafer on the support said means having adjustable means for positioning the wires extending therefrom, means for moving the holding means, means for actuating the moving means, a source of electrical energy for the heating member and a control circuit for sequentially actuating the moving means to raise the wires off the body, to heat the body to an initially high temperature, to actuate the moving means to lower the wires into fusing contact with the body and to maintain the body at the initial high temperature for a fixed period of time and finally to gradually decrease the temperature of the body to a lower temperature.

5. A machine for fusing wire leads to a body comprising a heating support member for the body, movable means for holding the wires on a body on the support, said means having adjustable means for positioning wires extending therefrom, means for moving the holding means, means for actuating the moving means, a source of energy for the heating member and a control circuit having means for actuating the moving means to lift the wires off the body, means operative after the wires have been lifted for applying heating energy to the support for a first timed interval to heat the body to a predetermined temperature, means operative after said interval for simultaneously actuating the moving means to lower the wires into contact with the body and to maintain the temperature of the body substantially constant at said predetermined temperature for a second timed interval and means operative at the conclusion of the second interval for gradually decreasing the temperature of the body.

6. A machine according to claim 5 in which the support member is electrically heated and the means for gradually decreasing the temperature of the body includes a motor driven variable autotransformer and the control circuit includes means for reversing the motor at the end of a fusing operation to reset the autotransformer to its starting position.

7. A machine for fusing wire leads to a semiconductor wafer comprising an electrical heating member for the wafer having means for accurately locating the wafer thereon, a movable holder for the wires having means for positioning wires extending therefrom on a wafer on the heating member, means for moving the holder, a step-down transformer for the heating member, means connecting the heating member to the low voltage winding of the transformer, a source of electrical power for the transformer and means for varying the power input to the transformer and a control circuit for actuating the holder moving means and the transformer power input varying means to actuate the moving means to raise the wires off the wafer and then to apply for a first fixed period of time a large power input to the transformer, to actuate the moving means to lower the wires on the wafer at the end of the first fixed period and simultaneously lower the power input to the transformer to maintain the temperature of the wafer substantially constant at the high initial temperature for a second fixed period of time starting at the end of the first timed period and at the end of the second fixed period to gradually decrease the power input to the transformer to lower the temperature of the wafer.

8. A machine for fusing wire leads to a semiconductor wafer comprising an electrical heating member for the wafer, movable holding means for holding the wires on a wafer on the heating member, means for moving the holding means, a power source, means energized by the source for actuating the moving means, a step-down transformer, means connecting the heating member to the low voltage winding of the transformer, means for deriving energy at various potential differences from the source, and a control circuit including time delay relays for sequentially energizing the actuator for the moving means to raise the wires off the wafer and, after the wires are lifted, for applying energy at a first high potential difference to the transformer to heat the wafer to an initially high temperature within a first timed interval, for energizing the actuating means to lower the wires on the heated wafer and simultaneously lower the input to the transformer for a second timed interval to maintain the wafer substantially at the initially high temperature and at the conclusion of the second interval to reduce the input to the transformer to gradually lower the temperature of the wafer.

References Cited in the file of this patent

UNITED STATES PATENTS

| | | |
|---|---|---|
| 1,026,456 | Rambaud | May 14, 1912 |
| 2,494,474 | Fermanian et al. | Jan. 10, 1950 |
| 2,602,872 | Ziegler | July 8, 1952 |